United States Patent Office 3,551,236
Patented Dec. 29, 1970

3,551,236
**METHOD AND APPARATUS FOR THE MANU-
FACTURE OF NET-LIKE MATERIALS**
Theodore H. Fairbanks, R.D. 4,
West Chester, Pa. 19380
Filed July 10, 1968, Ser. No. 743,759
Int. Cl. B32b 5/08
U.S. Cl. 156—167                            10 Claims

ABSTRACT OF THE DISCLOSURE

A method and apparatus for making a net-like structure in which continuous strand-forming streams, moving along periodically contacting sinuous paths, are provided by extruding flowable plastic material under pulsating pressure through individual orifices which are inclined relative to a horizontal plane, with the extruded streams being set beyond locations at which they contact.

---

Figure 1:
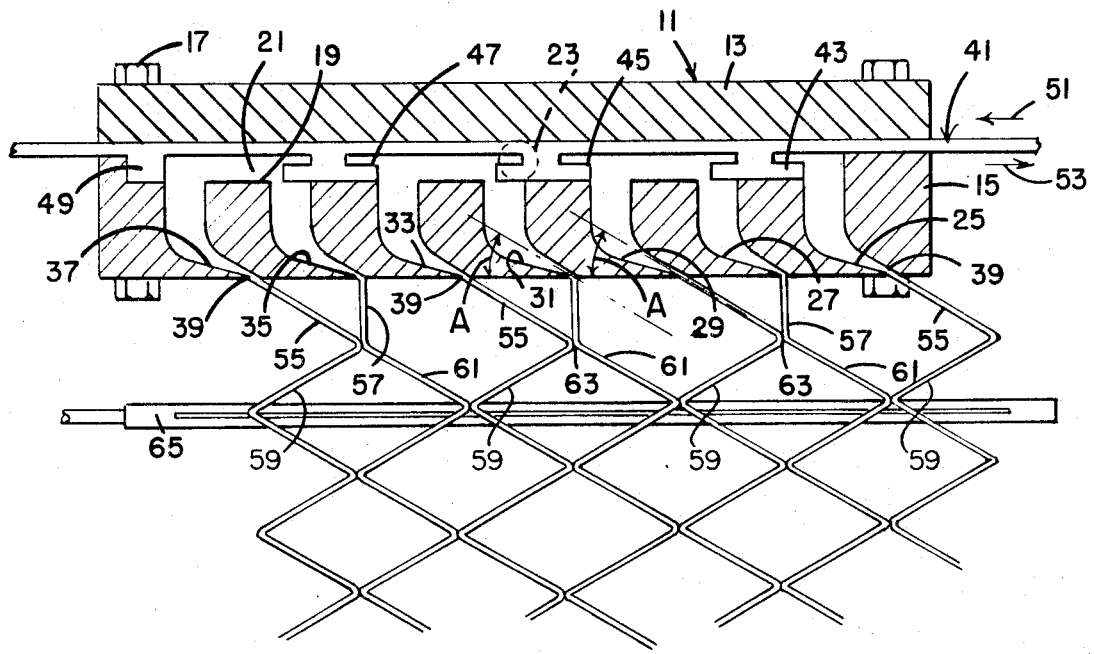

The present invention relates to an improved method and apparatus for making net-like structures by extrusion.

U.S. Pat. No. 2,919,467 is directed to the manufacture of net-like structures in which the mesh intersection-forming portions are each composed of an integrally extruded plastic mass and the mesh strand-forming portions are divisions of such intersection-forming portions, with the whole fabric or structure being an integrally extruded entity. The net-like structure produced by this method varies in thickness, with the portions at which the strands intersect being twice the thickness of the strands themselves. As a result, said fabrics lack flexibility and are not wholly suitable for many uses, as for example as bonded reinforcements for sheets or films.

U.S. Pat. No. 3,127,298 discloses an apparatus for making flat netting by extruding plastic material through a plurality of spaced nozzles in which adjacent nozzles are periodically swung toward each other so that the streams extruded therefrom can weld together without crossing. Such apparatus requires numerous moving parts and is not entirely suitable for making extremely fine mesh netting. Accordingly, a primary object of this invention is to provide a generally new or improved and more satisfactory method and apparatus for making net-like structures and fabrics.

Another object of this invention is the provision of a method and apparatus capable of producing net-like structures having fine mesh openings.

Still another object is to provide a method and apparatus for making net-like structures of different designs or configuration.

A further object is the provision of an improved method and apparatus for making net-like structures at high rates of speed.

A still further object is to provide an improved apparatus for making net-like structures having a minimum of moving parts.

These and other objects are accomplished in accordance with the present invention by a method in which flowable plastic material is continuously extruded under pulsating pressure through each of a series of spaced orifices which are inclined to substantially the same degree relative to a horizontal plane to thereby provide continuous strand-forming streams having sinuous paths. The pressure pulsations applied to the plastic material extruded through adjacent of such orifices are 180° out of phase in frequency and of such amplitude as to cause adjacent strand-forming streams to periodically contact and bond with each other and thereby provide strand junctions. These strand-forming streams and junctions are then set to provide integral net-like structures.

By the method of the present invention, flat net-like structures or fabrics may be produced by extruding the flowable plastic material through a series of orifices which have their longitudinal axes located in a common plane and which are inclined in the same direction. Alternatively, net-like structures which are other than flat, such as tubular or perhaps corrugated, may be made by the method of the present invention by extruding the flowable material through a series of orifices in which the longitudinal axes of at least certain adjacent orifices do not themselves cross but are located in vertical planes which intersect with each other.

The pressure pulsations applied to the plastic material extruding through the orifices may be of like frequency and may be either constant or together varied during the extrusion operation. If desired, the pressure pulsations applied to the plastic material extruded through certain orifices may differ, as by being a multiple of the frequency of the pressure pulsations applied to plastic material extruded through other of such orifices.

Broadly, the apparatus of the present invention includes means defining a series of spaced extrusion orifices having longitudinal axes which are inclined to substantially the same degree relative to a horizontal plane, means for feeding a flowable plastic material to adjacent of such orifices under pulsating pressures which are at least 180° out of phase in frequency and means for setting the flowable plastic material extruded from such orifices.

In such apparatus the extrusion orifice may be disposed in a common vertical plane with their longitudinal axes located in substantially parallel planes. The net-like structures produced with such apparatus will be substantially flat. Net-like structures other than flat, such as tubular or corrugated, may be produced with the described apparatus by disposing at least certain of the extrusion orifices so that their longitudinal axes do not themselves cross but are located along vertical planes which intersect with each other.

The cross-sectional dimensions of the orifices and the distances between pairs of adjacent orifices may, but need not be uniform. The amplitude or magnitude of the pressure pulsations applied to the plastic material extruded through any particular orifice will thus depend upon the orifice size and its distance from an adjacent orifice. With the method and apparatus of the present invention it is also possible to extrude plastic material of different composition or character through at least certain of the orifices and thus the particular material being extruded may have some bearing upon the pressure pulsations which are applied.

The application of pressure pulsations to the plastic material extruded through each of the series of orifices may be achieved by any suitable and convenient means. For example, a feed screw driven at a periodically varying rate of speed may be employed when relatively slow pressure pulsations are to be applied to the plastic material, while more rapid pressure pulsations may be obtained by the use of equipment capable of generating sonic vibrations.

The teachings of the present invention are applicable for use with a variety of materials, which are referred to by the term "plastic," including materials which are thermoplastic, such as polyamides or superpolyamides, polyesters, polyvinyl chloride, copolymers thereof, polyolefins, cellulose acetates, etc., natural or synthetic rubbers, thermosetting materials or wet-spinnable materials, such as viscose, cupro-ammonium cellulose, or carboxymethyl cellulose. Such materials may include various additives such as stabilizers, dyes, foaming agents, etc., if so desired. It will be apparent that the manner by which the extruded junction and mesh-strand forming streams are set will depend upon the particular material which is being employed.

Figure 3:
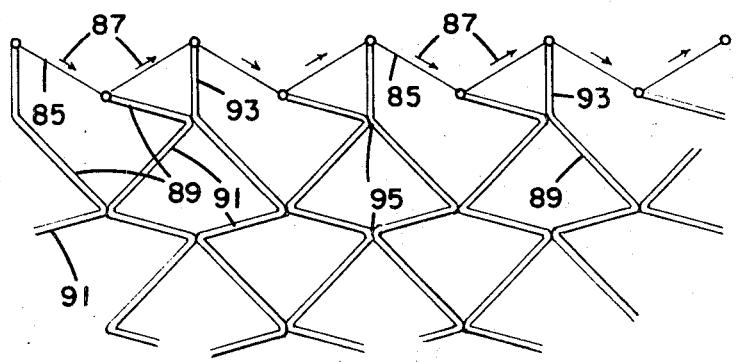
Figure 2:
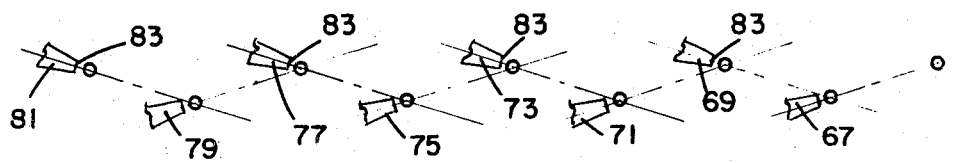

For a greater understanding of the invention, reference is made to the following detailed description and drawing, in which FIG. 1 is a vertical section taken transversely of one embodiment of the apparatus of the present invention;

FIG. 2 is a diagrammatic top view of a modified arrangement of the apparatus of the present invention; and FIG. 3 is a side view of a net-like structure formed by the apparatus shown in FIG. 2.

With reference to the drawing, FIG. 1 illustrates one specific embodiment of apparatus which includes a housing 11 having top and bottom plates or walls 13 and 15 secured together as by bolts 17. The bottom plate 15 is hollowed out at 19 and together with the top plate 13 forms a chamber 21 into which opens a conduit 23 for delivering flowable plastic material, such as molten polypropylene, under a constant pressure from a suitable source, not shown. A series of equally spaced, curved passages 25, 27, 29, 31, 35 and 37 extend from the chamber 21, through the bottom plate 15 and terminate with extrusion orifice 39. The series of orifices 39 are all aligned in a common vertical plane with their longitudinal axes being disposed in parallel planes which are inclined in the same direction and substantially to the same degree relative to a horizontal plane, as indicated at A. The walls forming the individual passages are of curved contour to provide for a smooth flow of plastic material therethrough.

A bar 41 extends through housing 11, along the bottom surface of the top plate 13, and includes a plurality of spaced shutters 43, 45, 47 and 49 which project into housing chamber 21. As indicated by arrows 51 and 53 this shutter bar 41 is adapted to be reciprocated relative to the housing 11 by suitable means, as for example a vibrator, not shown. The shutters 43, 45, and 47 are of like size and shape and are adapted to partially close off, in alternate relationship, each of two passages which are adjacent thereto. The shutter 49 serves only to partially close off the outermost passage 37 which is adjacent thereto and thus is of different size and shape than the remainder of such shutters.

In the operation of the above-described apparatus, flowable plastic material is delivered under a constant or uniform pressure into the chamber 21 through the conduit 23. In the position shown in FIG. 1, the shutter bar 41 has completed its movement in the direction of arrow 51 so that the alternate passages 25, 29, 33 and 37 are completely uncovered while the remaining passages 27, 31 and 35 are partially closed off by the respective shutters 43, 45 and 47.

The plastic material flowing into and through the unobstructed passages 25, 29, 33 and 37 will be under maximum pressure, which is substantially the same as that applied to the material entering through the conduit 23. The flowable plastic material will thus issue from the orifice 39 of the respective passages 25, 29, 33, and 37 as continuous streams 55 which, as illustrated in FIG. 1, extend along the axes of such orifices and are at the height of their trojectory.

The remaining passages 27, 31 and 35 are partially closed off to their intended maximum degrees by the respective shutters 43, 45 and 47 and thus the flowable plastic material passing therethrough will be under a minimum desired pressure. Such plastic material will thus issue from the orifices 39 of the respective passages 27, 31 and 35 in a generally vertical direction as continuous streams 57.

From the position shown in FIG. 1, the shutter bar 41 is now moved in the direction of the arrow 53 whereby the shutters 43, 45, 47 and 49 each commence to cover the respective passages 25, 29, 33 and 37 while simultaneously uncovering the remaining passages 27, 31 and 35. The flowable plastic material flowing through the passages 25, 29, 31 and 35 will therefore be subjected to gradually reduce pressure, so that streams 55 issuing from the respective orifice 39 will assume paths as indicated at 59. The pressure applied to the flowable plastic material passing through the passages 27, 31 and 35, will, of course, be simultaneously and gradually increased so that the streams issuing therefrom will soon pass as indicated at 61.

As the shutter bar 41 approaches and assumes the limit of it movement in the direction of arrow 53, the passages 25, 29, 33 and 37 are covered to the intended maximum degree by the respective shutters 43, 45, 47 and 49. The flowable plastic material in such passages is under a minimum desired pressure and issues from the respective orifice as continuous generally vertical extrusion. At the same time the flowable plastic material in the passages 27, 31 and 35 is under a desired maximum pressure and thus the flowable plastic material issuing from their respective orifices are at the height of their trajectory.

It will be noted that while alternate sterams are at the height of their trojectory the streams adjacent thereto assume generally vertical paths and that such adjacent streams contact with each other, at least momentarily, bond, and together form junctions as indicated at 63. It will be further noted that with continued reciprocation of the shutter bar 41, as described above, the streams issuing from the respective orifice 39 each following a sinuous path with the adjacent streams periodically contacting each other. Suitable means are provided for setting the extruded streams of flowable plastic material, as for example an air nozzle 65 when molten plastic material is being extruded.

In the specific apparatus described above, the flowable plastic material is delivered to all passages from a common chamber and the pressure pulsations applied to such flowable plastic material are controlled by a common means; namely, the reciprocating shutter bar 41. It will thus be apparent that the pressure pulsations applied to the flowable plastic material passing through the passages will be of like frequency and amplitude and that the streams issuing from the orifice 39 will all have similar sinuous paths. As heretofore mentioned, the method and apparatus of the present invention may be varied, for example by changing the spacing between adjacent orifices, feeding materials of different composition or character to at least certain of the passages, or by applying pressure pulsations of different frequency to the flowable plastic material passing through at least selected of adjacent passages.

In the apparatus shown in FIG. 1, all of the extrusion passages are formed in a single housing and have extrusion orifices disposed in a common vertical plane. It will be understood that individual nozzles may be employed and/or that the longitudinal axes of the extrusion orifices extending along intersecting planes. Thus, the arrangement shown in FIGS. 2 and 3, employs individual nozzles 67, 69, 71, 73, 75, 77, 79 and 81, each having an extrusion orifice 83 and each preferably being independently supplied with a flowable plastic material under a pulsating pressure from a suitable source, not shown.

As indicated by lines 85 and arrows 87 in FIG. 3, the longitudinal axes of the individual extrusion orifices 83 do not cross with each other. More particularly, and as shown in FIG. 2, the longitudinal axes of alternate extrusion orifices are located along substantially parallel planes and that such planes intersect with planes containing the axes of the extrusion orifices which are adjacent thereto.

The operation of this embodiment of the invention is generally similar to that shown in FIG. 1. Initially, flowable plastic material being continuously delivered to all of the nozzles under pulsating pressure and issues from the respective orifices as continuous streams. The frequency of the pressure pulsations applied to the plastic material delivered to the nozzles 67, 71, 75 and 79 are in phase with each other and 180° out of phase with the pressure pulsation applied to the flowable plastic material issuing from the orifices of the nozzles which are adjacent thereto; namely, nozzles 69, 73, 77 and 81. In view of the pressure pulsation under which the flowable plastic material is delivered to each of the nozzles, the streams issuing from the respective orifices will each follow a sinuous path.

The amplitude of these pressure pulsations must be such that the stream issuing from any particular orifice periodically contacts with the steam extruded from an adjacent orifice.

Under the above conditions, the flowable plastic material will issue from all of the orifices 83 as continuous streams, each of which alternately moves in the directions as indicated at 89 and 91 when such plastic material is under desired maximum and minimum pressure, respectively. Thus, when the plastic material delivered to the nozzles 67, 71, 75 and 79 is increasing to a maximum desired pressure, the streams issue from the respective orifices 83 in the direction indicated at 89 until they are at their maximum trajectory. Simultaneously, plastic material issues from the orifices of the remaining nozzles 69, 73, 77 and 81 in the directions 91 until the pressure on such material is at a minimum and issues substantially vertically as shown at 93. As the streams which are extruded under maximum desired pressure assume their maximum trajectory, they will contact and bond with the streams which are extruded under minimum pressure and thus form junctions as shown at 95.

The streams issuing from the orifices of the nozzles 67, 71, 75 and 79 will, of course, move in the direction 91 as the pressure applied to the plastic material forming such streams is reduced, while the streams issuing from the orifices 83 of nozzles 69, 73, 77 and 81 move in the direction 91 as they are extruded under increasing pressure.

With the continued extrusion of flowable plastic material under pulsating pressure, as described, a continuous net-like structure is produced which can be set by any suitable means, as for example cool air when molten plastic material is extruded. Since the longitudinal axes of adjacent extrusion orifices of the nozzles shown in FIG. 2 are all disposed at angles to each other, the resulting net-like structure is not flat but of generally corrugated configuration.

It is to be understood that changes and variations may be made without departing from the spirit and scope of the invention as defined in the appended claims.

I claim:

1. Method of making a plastic net-like structure composed of strands and strand junctions including the steps of continuously extruding flowable plastic material under pressure downwardly through each of a series of spaced orifices which are inclined substantially to the same degree relative to a horizontal plane to provide a plurality of continuous strand-forming streams, pulsating the pressure applied to the plastic material whereby the streams of strand-forming materials are extruded along sinuous paths, the pressure pulsations applied to plastic material extruded through adjacent orifices being at least 180° out of phase in frequency and of such amplitude as to cause adjacent strand-forming streams to periodically contact and bond with each other to provide junctions and setting the extruded strand-forming streams and junctions to provide an integral net-like structure.

2. A method as defined in claim 1 wherein the longitudinal axes of all of the extrusion orifices are inclined in the same direction and are located in a common vertical plane.

3. A method as defined in claim 2 wherein the pressure pulsations applied to plastic material extruded through adjacent orifices are of like frequency and amplitude.

4. A method as defined in claim 1 wherein the longitudinal axes of at least certain of adjacent orifices are located in vertical planes which intersect with each other.

5. A method as defined in claim 4 wherein the pressure pulsations applied to plastic material extruded through adjacent orifices are fo like frequency and amplitude.

6. Apparatus for continuously extruding a net-like structure including means defining a series of spaced extrusion orifices having longitudinal axes inclined to substantially the same degree relative to a horizontal plane, means for feeding a flowable plastic material to adjacent of said orifices under pulsating pressures which are at least 180° out of phase in frequency and means for setting the flowable plastic material extruded from said orifices.

7. Apparatus as defined in claim 6 wherein the extrusion orifices are in a common vertical plane and the longitudinal axes thereof located in substantially parallel planes.

8. Apparatus as defined in claim 7 wherein the longitudinal axes of all of the extrusion orifices are uniformly spaced.

9. Apparatus as defined in claim 6 wherein the longitudinal axes of at least certain of adjacent extrusion orifices are located along vertical planes which intersect with each other.

10. Apparatus as defined in claim 6 wherein said means defining said series of orifices includes a housing having walls forming a chamber into which flowable plastic material is delivered, a plurality of passages extending through the bottom wall of said housing, each of said passages opening at one end into said chamber and at their opposite ends terminating with extrusion orifices, and wherein said plastic feeding and pressure pulsating means includes a bar positioned with said chamber and extending the length thereof, means for reciprocating said bar relative to the said passage and shutters carried by said bar partially closing off adjacent passages in alternate relationship during reciprocating of said bar.

References Cited

UNITED STATES PATENTS 3,178,328   4/1965   Tittmann _____ 156—181

CARL D. QUARFORTH, Primary Examiner

B. H. HUNT, Assistant Examiner

U.S. Cl. X.R.

264—167; 156—180, 181, 441, 500